(12) United States Patent
Hock

(10) Patent No.: US 10,035,377 B2
(45) Date of Patent: Jul. 31, 2018

(54) AXLE ATTACHMENT

(71) Applicant: SAF-HOLLAND, GmbH, Bessenbach (DE)

(72) Inventor: Helmut Hock, Bessenbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 616 days.

(21) Appl. No.: 14/397,606

(22) PCT Filed: Mar. 25, 2013

(86) PCT No.: PCT/EP2013/056194
§ 371 (c)(1),
(2) Date: Oct. 28, 2014

(87) PCT Pub. No.: WO2013/164139
PCT Pub. Date: Nov. 7, 2013

(65) Prior Publication Data
US 2015/0145228 A1 May 28, 2015

(30) Foreign Application Priority Data
Apr. 30, 2012 (DE) .................. 10 2012 207 157

(51) Int. Cl.
*B60B 35/00* (2006.01)
*B60G 9/00* (2006.01)
(Continued)

(52) U.S. Cl.
CPC ............ *B60B 35/007* (2013.01); *B60B 35/02* (2013.01); *B60G 9/003* (2013.01); *B60B 35/04* (2013.01);
(Continued)

(58) Field of Classification Search
CPC ....... B60B 35/007; B60B 35/02; B60B 35/04; B60B 2310/305; B60B 2310/306;
(Continued)

(56) References Cited

U.S. PATENT DOCUMENTS 3,154,300 A 10/1964 Wenzel
2011/0227308 A1 9/2011 Aalderink et al.

FOREIGN PATENT DOCUMENTS

DE 4212313 10/1993
DE 29615286 11/1996
(Continued)

OTHER PUBLICATIONS

European Patent Office; International Search Report; dated Jun. 14, 2013.

*Primary Examiner* — Paul N Dickson
*Assistant Examiner* — Joselynn Y Sliteris
(74) *Attorney, Agent, or Firm* — Price Heneveld LLP

(57) ABSTRACT

An axle attachment includes a guide element having a guide-side attachment region that is curved in a concave manner and a guide-side fixing region adjoining the guide-side attachment region along the curvature line, and a clamping element having a clamping-side attachment region that is curved in a concave manner and that is arranged opposite the guide-side attachment region, and a clamping-side fixing region. A fixing element engages into a guide-side fixing region and into an opposing clamping-side fixing region and forces the regions against each other in order to fix an axle body to the axle attachment in a force-fitting manner.

29 Claims, 4 Drawing Sheets

(51) Int. Cl.
*B60B 35/02* (2006.01)
*B60B 35/04* (2006.01)

(52) U.S. Cl.
CPC ... *B60B 2310/302* (2013.01); *B60B 2310/305* (2013.01); *B60B 2310/306* (2013.01); *B60B 2360/1442* (2013.01); *B60B 2360/1448* (2013.01); *B60B 2900/321* (2013.01); *B60G 2200/31* (2013.01); *B60G 2204/4306* (2013.01); *B60G 2204/44* (2013.01); *B60G 2206/81* (2013.01); *B60G 2206/8201* (2013.01); *B60G 2206/8207* (2013.01); *B60Y 2200/142* (2013.01); *B60Y 2200/147* (2013.01)

(58) Field of Classification Search
CPC ...... B60B 2360/1442; B60B 2900/321; B60B 2310/302; B60B 2360/1448; B60G 9/003; B60G 2206/81; B60G 2200/31; B60G 2204/4306; B60G 2204/44; B60G 2206/8201; B60G 2206/8207; B60Y 2200/147; B60Y 2200/142
See application file for complete search history.

(56) References Cited

FOREIGN PATENT DOCUMENTS

| | | |
|---|---|---|
| DE | 10118696 | 10/2002 |
| EP | 0830957 | 3/1998 |
| WO | 2010059037 | 5/2010 |
| WO | 2010095924 | 8/2010 |

AXLE ATTACHMENT

BACKGROUND OF THE INVENTION

The present invention relates to an axle attachment, in particular for use in commercial vehicles or utility vehicles.

Axle attachments are known in the prior art and usually relate to that region, in which the axle of a motor or utility vehicle is directly or immediately fixed to the vehicle frame thereof, via a trailing arm, for example. In this context, it is usual to design the axle attachment as U shaped fastening or fixing elements having a round cross-section, which have external threads at their respective ends and which clamp or brace the axle against the trailing arm or a leaf spring unit, for example. A disadvantage of such fixing elements is that the contact area between the axle and the fixing element, which area contributes to a frictional or force-fit connection of the axle attachment, is very small and, thus, it is in most cases necessary to reinforce the axle attachment by means of a welded joint. This increases the manufacturing outlay of the axle attachment, and the local temperature loading leads to material stresses or material internal stresses, which in addition impair the strength of the components to be connected. Furthermore, the axle attachment cannot be dismounted for maintenance purposes, and the outlay when handling the assembly, which thus becomes larger in size, increases.

The object underlying the present invention is to provide an axle attachment, which allows for a reliable and easy-to-produce attachment of the axle to the chassis of a vehicle, in particular a commercial vehicle, and which avoids the disadvantages of the prior art.

SUMMARY OF THE INVENTION

According to the invention, there is provided an axle attachment, in particular for commercial vehicles, said axle attachment comprising a guide element and a clamping element, wherein the guide element has a guide-side attachment region, which is curved in a concave manner, and a guide-side fixing region adjoining the guide-side attachment region, wherein the clamping element has a clamping-side attachment region, which advantageously is curved in a concave manner and which is arranged opposite the guide-side attachment region, and a clamping-side fixing region, wherein a fixing element is provided, which engages into a guide-side fixing region and into an opposing clamping-side fixing region and forces said regions against each other in order to fix an axle body to the axle attachment in a force-fitting manner. Preferably, the guide element is the trailing arm of a chassis, which with a first end is fixed to a bearing block, for example, in a pivoting or swiveling manner. Preferably, at a second end, which is opposite the first end, the guide element is supported by a spring element. The spring element preferably may engage the guide element also in the area between the first and the second end of the guide element. The guide element has a guide-side attachment region, which is curved in a concave manner. Preferably, the concave curvature is formed about an axis, which is identical to or runs parallel to the longitudinal axis of an axle body to be fixed by the axle attachment. The guide-side attachment region, to put it differently, is preferably an area of the guide element, in which the guide element follows an arc-shaped path about an axis running parallel to the cross axis of the vehicle. The guide-side attachment region preferably has a surface facing towards the inside, i.e. towards the axis of curvature of the concave curvature, which is adapted to be made to rest on an axle body at least in a certain area. Adjoining the attachment region, the guide element has one, preferably at least two, guide-side fixing regions. Preferably, the concavely curved, guide-side attachment region transitions into a region, which at least in a certain area is oppositely curved, which in turn transitions into the guide-side fixing region. The extension of the attachment region is preferably characterized in that in said region the guide element rests on the axle body to be fixed. The guide-side fixing region is characterized in particular by means for absorbing a force for fixing a clamping element to the guide element. Preferably, the guide-side fixing region has recesses or bores, which may be engaged by fixing means or fastening means, such as bolts/screws or pins. In order to urge an axle body into the attachment region of the guide element, there is provided a clamping element, which has a clamping-side attachment region and at least one clamping-side fixing region. The clamping-side attachment region is preferably curved in a concave manner, wherein the axis of curvature thereof is preferably arranged parallel to the axis of curvature of the guide-side attachment region. The clamping-side attachment region is preferably arranged opposite the guide-side attachment region such that between the two attachment regions there is spanned a space, in which an axle body may be arranged. According to the invention, the clamping element has at least one clamping-side fixing region, which is preferably engaged by the aforementioned fixing means or element so as to force the clamping-side fixing region and, thus, the clamping element, against the guide element. Preferably, to this end, the clamping-side fixing region has a recess, into which a fixing element, preferably in the form of a screw/bolt or pin, may be inserted. Preferably, the clamping-side attachment region, similar to the guide-side attachment region, has an inner surface, which is cylinder-shaped at least in sections and which may be made to rest against the axle body at least partially. Particularly preferably, the clamping element has at each side of the clamping-side attachment region a respective clamping-side fixing region, wherein the clamping element may be forced against the guide element by means of at least two fixing elements, and an axle body arranged between the attachment regions may be fixed to the guide element.

Preferably, the guide-side attachment region and/or the clamping-side attachment region is/are formed cylinder-shaped, wherein the attachment regions preferably have an extension along the cylinder axis, which is in a relationship of 0.5 to 3, preferably 0.75 to 2, and particularly preferably about 0.9 to 1.5 to a radius of curvature of the guide-side attachment region. In this context, the cylinder axis is defined as the longitudinal axis of an imaginary cylinder, which is at least partially formed by the guide-side and the clamping-side attachment regions, respectively. Here, the longitudinal extension of the respective attachment region in the case of a given radius of curvature determines the size of the surface, with which the attachment region may contact the axle body. The larger said contact area, the greater the strength of a force-fit connection, which is due to friction, of the respective attachment region. The radius of curvature of the attachment regions depends in particular on the outer dimensions of the axle body in the area of the attachment, wherein a larger or thicker axle requires a larger radius of curvature of the attachment region. Since a larger axle in most cases also absorbs and transmits larger moments and forces, also the requirements on the strength of the axle attachment increase, and it is particularly preferred to dimension larger also the extension of the attachment region or of the attachment regions along the cylinder axis. Here, the relationships of 0.5 to 3 are the limits for said dimensions, which should not be undercut or exceeded so as not to undersize or oversize the attachment for absorbing certain forces and moments. In order to be able to support the high loads on the axle attachment, the guide element, and preferably also the clamping element, are made from spring steel, wherein the spring steel is characterized in that it has a low proneness to brittle fracture, a high tensile strength and a high elasticity, i.e. in the case of a tensile load, the amount of elastic elongation clearly exceeds the amount of plastic deformation.

Further preferably, the guide-side attachment region in a first state has a first radius of curvature, and in a second state, it has a second radius of curvature, which is smaller than the first radius of curvature. The first state is preferably that state, in which the guide element is not connected to the clamping element, i.e. the state before the axle attachment is mounted. In this state, the guide-side attachment region has a first radius of curvature, which advantageously is sufficiently large to make it possible to insert an axle body into the guide-side attachment region without applying great forces. Due to the forces applied by the fixing elements, which forces are established via the guide-side and the clamping-side attachment regions between the clamping element and the guide element, the guide element is preferably deformed such that the radius of curvature of the guide-side attachment region is made smaller. The guide-side attachment region reaches its second state with a second radius of curvature, which is smaller than the first radius of curvature. The second state of the guide-side attachment region is particularly preferably the mounted state of the axle attachment, in which an axle body is fixed between the guide element and the clamping element in a preferably force-fitting manner. For the further preferred case that the curvature of the guide-side attachment region is not circular, but elliptical or polyhedral, for example, the radius of curvature is to be understood as mean radius of curvature.

Preferably, the guide-side attachment region follows an elliptical or circular arc spanning an angle of the arc, wherein in a first state of the guide-side attachment region, the first angle of the arc preferably is 170° to 195°, particularly preferably 175° to 185°, and most preferably about 178° to 182°. As has been described above, the first state of the guide-side attachment region is preferably the state before the axle is mounted. In this state, the concavely curved, guide-side attachment region preferably spans an arc having a first angle of the arc of about 180°.

Alternatively preferably, the guide-side attachment region has a polyhedral section spanning an angle of the arc, wherein in a first state of the guide-side attachment region the first angle of the arc is preferably 170° to 195°, particularly preferably 175° to 185°, and most preferably about 178° to 182°. Analogously to the arc spanned by a circular section, also a preferably polyhedrally formed section of the guide-side attachment region spans an arc. Advantageously, the preferred angle of the arc helps to adjust the clamping behavior of the guide element to the respective axle body to be fixed.

Advantageously, in a second state of the guide-side attachment region, a second angle of the arc is 1.01 to 1.5 times, preferably 1.05 to 1.3 times, and in particular 1.1 to 1.2 times the first angle of the arc. The second state of the guide-side attachment region is preferably characterized in that an axle body is fixed to the axle attachment. In this second state, the guide element preferably is deformed such that the segment of the arc spanned by the guide-side attachment region has a second angle of the arc, which is larger than the first angle of the arc. In case the second angle of the arc is larger than 180°, the guide-side attachment region forms an undercut, which advantageously prevents the axle body from sliding out of the guide-side attachment region. The upper limit of an angle of the arc relationship of 1.2 marks the maximum degree of deformation, into which the guide element should be forced at most, since in the case of a greater degree of deformation, there is both more strain on the material of the guide element and the restoring force of the guide element acting on the fixing elements increases.

Preferably, the force applied by the fixing element in the second state of the guide-side attachment region essentially acts perpendicular to the second radius of curvature of the guide-side attachment region. Particularly preferably, the fixing regions of the guide element and of the clamping element are arranged such that in the second state of the fixing element, there is established a force between said fixing regions, which preferably acts essentially parallel to the tangent of the curvature of the guide-side or of the clamping-side attachment region, respectively. To put it differently, the force applied by the fixing element acts preferably as a tensile force along the circumference of the attachment region.

Preferably, the clamping element has at the ends of the clamping-side attachment region a projection and/or recess, which engages into a corresponding recess and/or projection of the guide element in a form-fitting manner. In a first preferred embodiment, the clamping element has one or a plurality of projections, which preferably, continuing the course of the line of curvature of the clamping-side attachment region, project from the clamping element in the direction of the guide-side attachment region. In this embodiment, the guide element has accordingly corresponding recesses, which preferably are introduced into the end edges of the guide-side attachment region and which are engaged by the projections of the clamping element. The preferred form-fitting engagement of the projections in the recesses secures the clamping element in particular against displacement transverse to the line of curvature of the attachment regions. Alternatively preferably, the guide element has one or a plurality of projections, which engage into corresponding recesses on the clamping element in a form-fitting manner. Also a combination of a projection and a recess on the guide element, which engage into a recess and a projection on the clamping element, may preferably be used.

Particularly preferably, on the clamping element there is provided a projection, which is wedge-shaped at least in a certain area and which is urged into a recess on the guide element, which recess is formed wedge-shaped at least in a certain area, when the clamping element is clamped or braced against the guide element, wherein the projection preferably exerts a force on an axle body to be fixed along the second radius of curvature. Preferably, the projection and/or the corresponding recess is/are provided with a cross-section tapering in the direction of insertion. For example, a wedge shape or a cone shape or a half cone shape may be preferred. Particularly preferably, in the second state of the axle attachment, the projection jams between the guide element, or preferably between the recess provided in the guide-side attachment region, and the axle body accommodated by the axle attachment. In this way, the projection exerts a locally high surface pressure onto the axle body and secures the same in a force-fitting manner against displacement relative to the axle attachment. Preferably, there are provided also on the axle body itself projections and/or recesses, which may be made to engage into the projections and/or recesses of the clamping element and/or of the guide element, respectively, in a form-fitting manner and, thus, support the force-fit combination of the axle body and the axle attachment by means of a form-fit.

Preferably, the side of the guide-side fixing region facing away from the clamping element is curved in a concave manner, wherein, preferably, there is provided an adapter element, which rests on the guide-side fixing region with a rounded surface and which transmits a force applied by the fixing element to the guide-side fixing region. The adapter element preferably serves for transmitting the force applied by the fixing element into a respective one of the fixing regions while avoiding stress peaks. To this end, the adapter element has an engagement section, which is engaged by the fixing element, and a rounded geometry in the region, in which it comes to rest on the fixing region of the guide element or of the clamping element. The respective corresponding fixing region has at its side facing the adapter element also a preferably rounded geometry. Particularly preferably, the contact areas of the adapter element and of the fixing region are congruent. To put it more simply, the adapter element preferably is a half cylinder shaped element, which has a bore for being engaged by the fixing element and which with its half cylinder shaped lateral surface comes to rest on the fixing region of the guide element or of the clamping element.

Preferably, the clamping element has four clamping-side fixing regions. Here, it may be preferred that two respective fixing regions are provided on each side of the clamping-side attachment region. Preferably, the clamping element is thus fixed to the guide element at four essentially evenly distributed points by preferably four fixing elements. It is also possible to fix it by means of a plurality of fixing elements per fixing region.

Furthermore, it is preferred that the clamping element is fixed to an axle body by a substance-to-substance bond or material bond. A welded joint, an adhesive joint or a soldered joint is preferred for this. Advantageously, the clamping element may also be formed and manufactured as an integral part of the axle body, thus reducing the mounting outlay and in particular the number of loose parts. At the same time, it is prevented that the axle body displaces or moves relative to the guide element not only by the force-fit via the guide-side attachment region, but also by the substance-to-substance bond of the clamping element and the axle body and its indirect form-fit connection with the guide element, which connection is made by means of the fixing elements.

It is further preferred that the guide-side attachment region is adapted to make a substance-to-substance connection or material bonded connection between the guide-side attachment region and an axle body. In order to further reinforce the connection of the axle body and the axle attachment, it is preferred to provide a substance-to-substance bond between the guide-side attachment region and the axle body. An adhesive joint or a soldered joint is particularly suitable for this. The guide-side attachment region may have rather small grooves or channels, for example, which favor the distribution of a solder applied between the axle body and the guide-side attachment region. Further preferably, a welded joint may be chosen, which is particularly preferably realized as a spot-welded joint.

Further advantages and features of the invention result from the following description of preferred embodiments of the axle attachment according to the invention with reference to the appended Figures. Individual features of the various embodiments may be combined with each other within the framework of the invention.

DETAILED DESCRIPTION OF THE PREFERRED EMBODIMENTS

Figure 1:
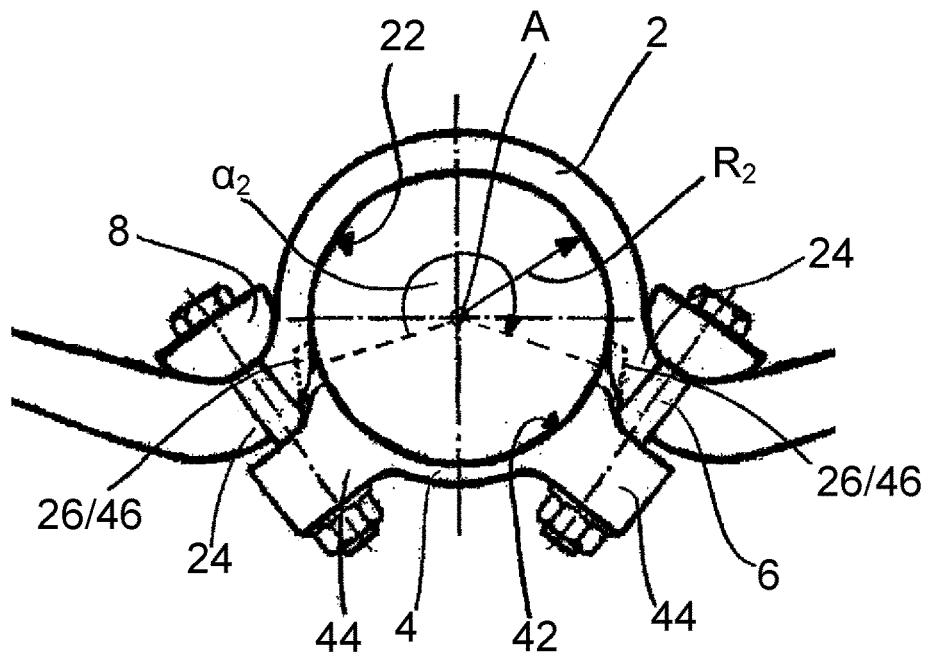
FIG. 1 a view of a preferred embodiment of the axle attachment of the invention.

FIG. 1 shows a view of a preferred embodiment of the axle attachment according to the invention in the direction of an axis A running preferably parallel to the cross axis of the vehicle. To put it differently, the viewer looks along the main extension direction of a vehicle axle to be fixed by means of the axle attachment. The guide element 2 has a guide-side attachment region 22 and two fixing regions 24, which are arranged to the right and to the left of the guide-side attachment region 22, respectively. The guide-side attachment region 22 has a concave curvature, particularly preferably running elliptically or circularly about the axis A. In the figure, the preferred second state of the guide-side attachment region 22 is shown, wherein in this state the clamping element 4 is fixed to the guide element 2 by means of a plurality of fixing elements 6, preferably two fixing elements 6, and forces the guide-side attachment region 22 against an axle body 10 arranged between the guide-side attachment region 22 and the clamping-side attachment region 42. The line of curvature of the guide-side attachment region 22 spans a preferably circular arc, wherein the angle of the arc $\alpha_2$ preferably is larger than 180°. The beginning and the end of the angle of the arc $\alpha_2$ are indicated by two radially running dashed lines in the figure. The horizontally running dot and dash line, which is also drawn, indicates an angle of the arc of 180°. In the second state, which state is shown, the guide-side attachment region 22 preferably has a mean radius of curvature $R_2$, wherein said radius of curvature $R_2$ particularly preferably corresponds to the radius of the connecting region of an axle body 10 to be fixed to the axle attachment. The guide-side fixing regions 24 have a geometry, which is concavely curved towards the top, wherein respective adapter elements 8 are provided in order to transmit the force applied by the fixing means 6 into the guide-side fixing region 24 while avoiding stress peaks insofar as this is possible. To this end, the adapter elements 8 have a rounded outer geometry, which allows for a favorable force transmission from the fixing element 6, via the adapter element 8, towards the respective guide-side fixing region 24. Preferably, the guide element 2 and the clamping element 4 have projections and/or recesses 26, 46, which correspond to each other and which prevent a displacement of the clamping element 4 relative to the guide element 2 along the axis A.

Figure 2:
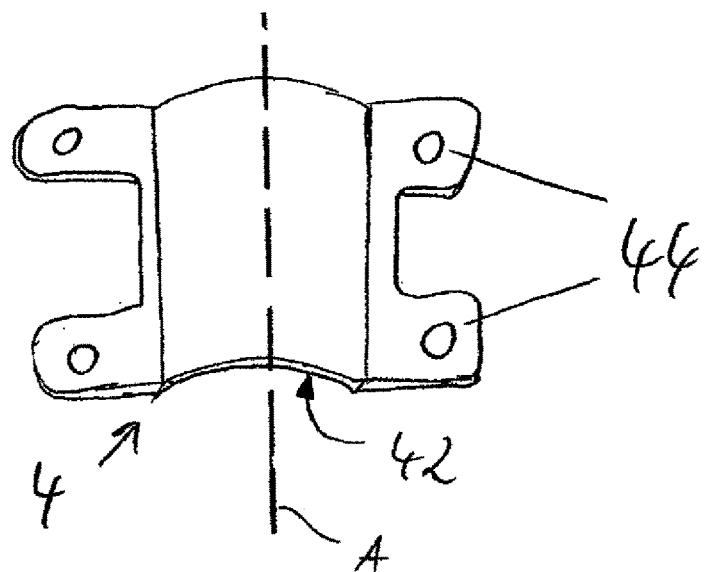
FIG. 2 a view of a preferred embodiment of the clamping element of the invention.

FIG. 2 shows a view of a preferred embodiment of the clamping element 4 according to the invention, wherein preferably four clamping-side fixing regions 44 are provided. Each of the clamping-side fixing regions 44 preferably has a bore, which may be engaged by a fixing element 6. Preferably there are additionally provided also 2 to 8, particularly preferably 4 bores per fixing region 44, which may be engaged by the corresponding number of fixing elements 6. In this embodiment, there is further shown a preferred relationship of the extension of the clamping-side attachment region 42 along the axis A to the radius of curvature of the clamping-side attachment region 42 of about 2. Analogously, said relationship may be determined for a corresponding guide-side attachment region 22.

Figure 3A:
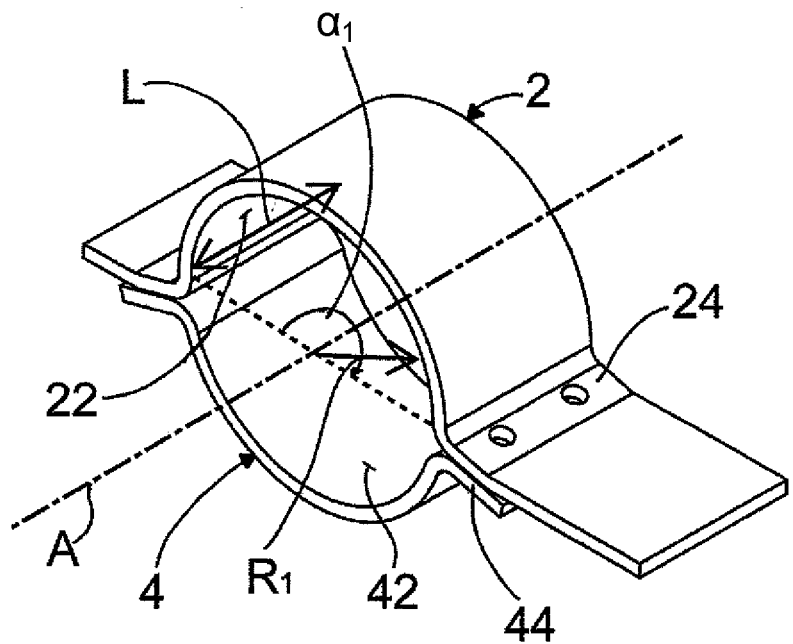
FIGS. 3a and 3b perspective views of preferred embodiments of the axle attachment of the invention.
Figure 3:
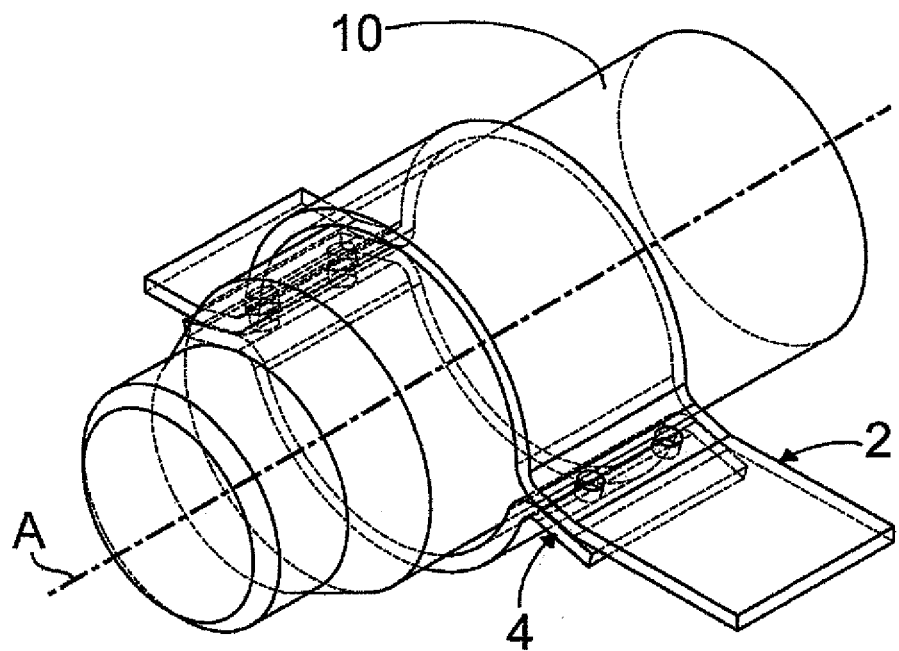

FIG. 3a shows a perspective view of a preferred embodiment of the axle attachment according to the invention in the first state. This state is preferably characterized in that the guide-side attachment region 22 is not forced against an axle body 10 by the clamping element 4. In this state, the guide-side attachment region 22 preferably has a mean radius of curvature $R_1$, wherein said radius of curvature $R_1$ preferably is larger than the radius of curvature $R_2$ in the second state. Preferably, as is visible in this view, the guide element 2 is a flat body, which is preferably shaped like a band and which in the area of the guide-side attachment region 22 has a half cylinder like section, with the axis A as cylinder axis. The guide-side attachment region 22 preferably has an extension L along the axis A, which is in a relationship of 0.5 to 3, preferably 0.75 to 2, and most preferably about 0.9 to 1.5 to the radius of curvature $R_1$ of the guide-side attachment region 22. The angle of the arc $\alpha_1$ is preferably the angle, which is spanned by the guide-side attachment region 22 in its first state, i.e. while the guide element 2 is not deformed by the clamping element 4. In the figure, a preferred angle of the arc $\alpha_1$ of about 180° is shown.

FIG. 3b shows a perspective view of the preferred embodiment already shown in FIG. 3a, wherein the axle body 10 preferably inserted into the axle attachment is shown. Preferably, the axle body 10 is a cylindrical, particular preferably a circular cylindrical body extending along the axis A, such as the axle of a commercial vehicle. It is further shown that the axle attachment, in particular the guide-side attachment region 22, in its first state has an excess via-à-vis the lateral surface of the axle body 10.

Figure 4:
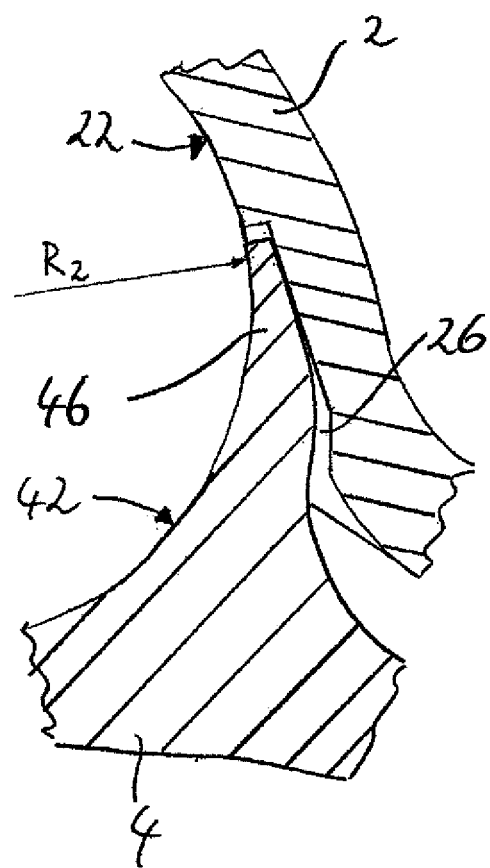
FIG. 4 a sectional view of a preferred embodiment having a projection and a corresponding recess.

FIG. 4 shows a sectional view of a preferred embodiment of a projection 46 provided on the clamping element 4, which projection engages a recess 26 provided on the guide element 2. The projection 46 and the corresponding recess have a cross-section, which preferably in a certain section is wedge-shaped, so that the deeper the projection 46 is urged into the recess 26, the projection 46 along the radius of curvature $R_2$ is preferably urged against an axle body 10 to be fixed.

Figure 5:
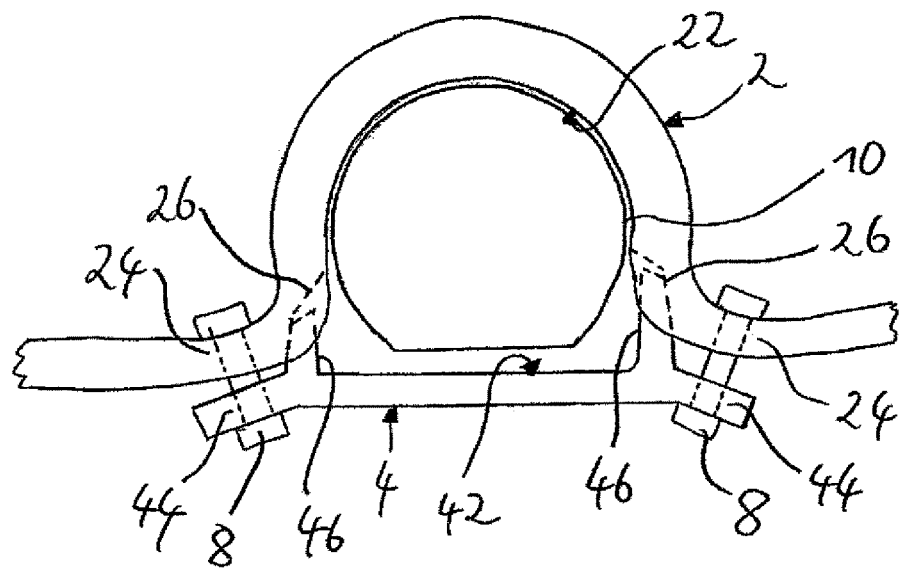
FIG. 5 a view of a preferred embodiment of the axle attachment of the invention.

FIG. 5 shows a further preferred embodiment of the axle attachment, wherein the clamping element 4 preferably has an essentially planar or flat formed clamping-side attachment region 42. Furthermore, the clamping element 4 preferably adjoining the attachment region 42 has two projections 46, which are provided in order to come into form-fitting engagement with corresponding recesses 26 on the guide element 2. Preferably, the clamping element 4 is adapted to come into a form-fit with the axle body 10 such that the axle body 10 is secured relative to the guide element 2 and the clamping element 4 not only against displacement but also against rotation. This may preferably be achieved by the shown planar design of the clamping-side attachment region 42 in combination with a partially planar formed geometry of the axle body 10. Preferably, the axle body 10 has a local, planar formed section, which comes into engagement with the clamping element 4.

Figure 6:
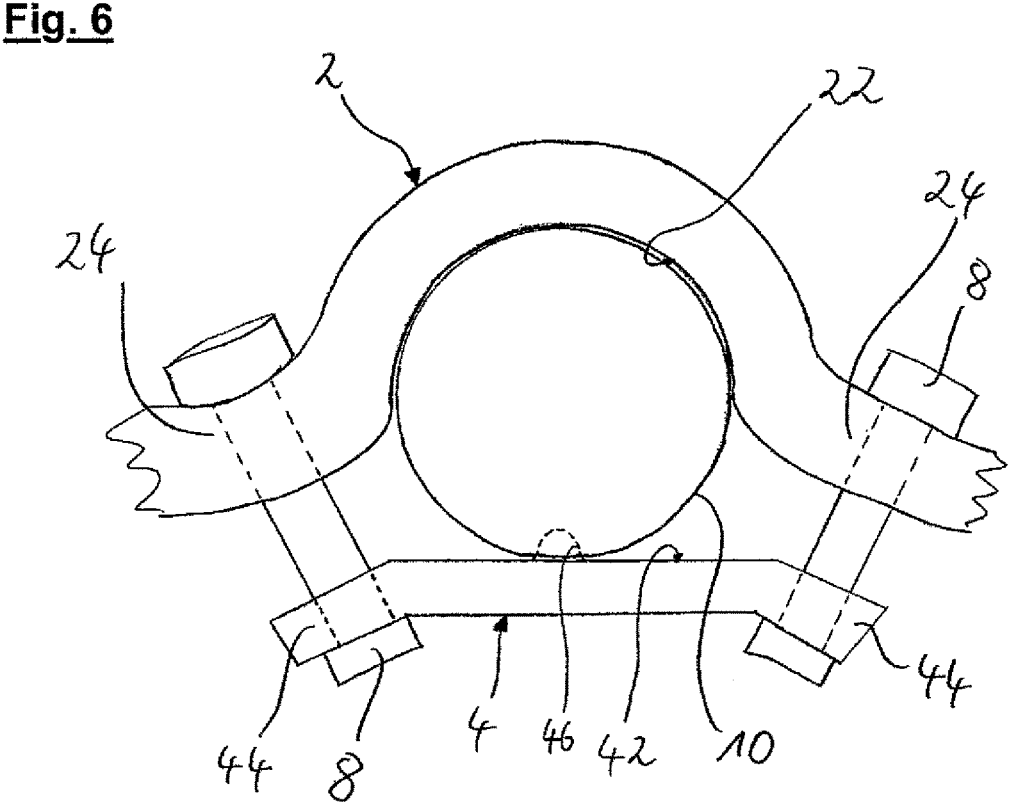
FIG. 6 a view of a preferred embodiment of the axle attachment of the invention.

FIG. 6 shows a preferred embodiment of the axle attachment according to the invention, wherein the clamping-side attachment region 42 essentially is formed planar and preferably has a projection 46, which may come into form-fitting engagement with the axle body 10. To this end, the axle body 10 preferably has a local recess, which may be engaged by the projection 46 of the clamping element 4 in order to secure the axle body 10 against rotation about its longitudinal axis. As a matter of course, alternatively or further preferably the axle body 10 may have a projection, which may engage into a recess 46 (not shown) of the clamping element 4. The projection or recess 46 is preferably wedge-shaped and particularly preferably may have a rounded tip or upper edge, as is shown in FIG. 6.

LIST OF REFERENCE SIGNS

2—guide element
4—clamping element
6—fixing element
8—adapter element
10—axle body
22—guide-side attachment region
24—guide-side fixing region
26—projection or recess
42—clamping-side attachment region
44—clamping-side fixing region
46—projection or recess
A—axis
$\alpha_1$—angle of the arc in the first state
$\alpha_2$—angle of the arc in the second state
L—extension
$R_1$—radius of curvature in the first state
$R_2$—radius of curvature in the second state

The invention claimed is:

1. An axle attachment, comprising:
a guide element; and
a clamping element;
wherein the guide element has a guide-side attachment region that is curved in a concave manner, and a guide-side fixing region adjoining the guide-side attachment region;
wherein the clamping element has a clamping-side attachment region that is arranged opposite the guide-side attachment region, and a clamping-side fixing region;
wherein a fixing element engages into a guide-side fixing region and into an opposing clamping-side fixing region and forces the guide-side fixing region and clamping-side fixing region against each other to fix an axle body to the axle attachment in a force-fitting manner; and
wherein the guide-side attachment region at least one of:
follows at least one of an elliptical arc and a circular arc which in a first state of the guide-side attachment region spans a first angle of the arc; and
includes a polyhedral section, which in a first state of the guide-side attachment region spans a first angle of an arc; and
wherein in a second state of the guide-side attachment region a second angle of the arc is within a range of 1.01 times to about 1.5 times the first angle of the arc.

2. The axle attachment of claim 1, wherein at least one of the guide-side attachment region and the clamping-side attachment region comprises a cylinder-shape, and wherein the attachment regions have an extension along a cylinder axis that is in a relationship of about 0.5 to about 3 to a radius of curvature of the guide-side attachment region.

3. The axle attachment of claim 2, wherein the relationship of the extension along the cylinder axis to the radius of the curvature of the guide-side attachment region is 0.75 to 2.

4. The axle attachment of claim 3, wherein the relationship of the extension along the cylinder axis to the radius of the curvature of the guide-side attachment region is 0.9 to 1.5.

5. The axle attachment of claim 2, wherein the guide-side attachment region in the first state has a first radius of curvature, and in the second state has a second radius of curvature that is smaller than the first radius of curvature.

6. The axle attachment of claim 5, wherein in the first state of the guide-side attachment region the first angle of the arc is about 170° to about 195°.

7. The axle attachment of claim 6, wherein in the first state of the guide-side attachment region the first angle of the arc is 175° to 185°.

8. The axle attachment of claim 7, wherein in the first state of the guide-side attachment region the first angle of the arc is 175° to 182°.

9. The axle attachment of claim 6, wherein in the second state of the guide-side attachment region the second angle of the arc is 1.05 times to 1.3 times the first angle of the arc.

10. The axle attachment of claim 9, wherein in the second state of the guide-side attachment region the second angle of the arc is 1.1 times to 1.2 times the first angle of the arc.

11. The axle attachment of claim 9, wherein a force applied by the fixing element in the second state of the guide-side attachment region acts substantially perpendicular to the second radius of curvature of the guide-side attachment region.

12. The axle attachment of claim 11, wherein the clamping element has at least one of a projection at the ends of the clamping-side attachment region that engages into a corresponding recess of the guide element in a form-fitting manner, and a recess at the ends of the clamping-side attachment region that receives a corresponding projection of the guide element in a form-fitting manner.

13. The axle attachment of claim 12, wherein the clamping element includes a projection that at least in a certain area is wedge-shaped and that is received into a recess on the guide element, wherein the recess is wedge-shaped at least in a certain area and that, when the clamping element is braced, is urged against the guide element such that the projection exerts a force onto an axle body to be fixed along the second radius of curvature.

14. The axle attachment of claim 11, wherein the clamping element includes a recess that is form-fitting engaged with an axle body, thereby securing the axle body against rotation relative to the clamping element.

15. The axle attachment of claim 12, wherein a side of the guide-side fixing region facing away from the clamping element is curved in a concave manner, and wherein an adapter element rests on the guide-side fixing region with a rounded surface and transmits a force applied by the fixing element to the guide-side fixing region.

16. The axle attachment of claim 15, wherein the clamping element includes four clamping-side fixing regions.

17. The axle attachment of claim 16, wherein the clamping element may be fixed to the axle body in a substance-to-substance bond.

18. The axle attachment of claim 17, wherein the guide-side attachment region is configured for a substance-to-substance bond between the guide-side attachment region and the axle body.

19. The axle attachment of claim 1, wherein the guide-side attachment region in the first state has a first radius of curvature, and in the second state has a second radius of curvature that is smaller than the first radius of curvature.

20. The axle attachment of claim 1, wherein in the first state of the guide-side attachment region the first angle of the arc is about 170° to about 195°.

21. The axle attachment of claim 1, wherein in the second state of the guide-side attachment region the second angle of the arc is 1.05 times to 1.3 times the first angle of the arc.

22. The axle attachment of claim 1, wherein a force applied by the fixing element in the second state of the guide-side attachment region acts substantially perpendicular to the second radius of curvature of the guide-side attachment region.

23. The axle attachment of claim 1, wherein the clamping element has at least one of a projection at the ends of the clamping-side attachment region that engages into a corresponding recess of the guide element in a form-fitting manner, and a recess at the ends of the clamping-side attachment region that receives a corresponding projection of the guide element in a form-fitting manner.

24. The axle attachment of claim 1, wherein the clamping element includes a projection that at least in a certain area is wedge-shaped and that is received into a recess on the guide element, wherein the recess is wedge-shaped at least in a certain area and that, when the clamping element is braced, is urged against the guide element such that the projection exerts a force onto an axle body to be fixed along the second radius of curvature.

25. The axle attachment of claim 1, wherein the clamping element includes a recess that is form-fitting engaged with an axle body, thereby securing the axle body against rotation relative to the clamping element.

26. The axle attachment of claim 1, wherein a side of the guide-side fixing region facing away from the clamping element is curved in a concave manner, and wherein an adapter element rests on the guide-side fixing region with a rounded surface and that transmits a force applied by the fixing element to the guide-side fixing region.

27. The axle attachment of claim 1, wherein the clamping element includes four clamping-side fixing regions.

28. The axle attachment of claim 1, wherein the clamping element may be fixed to an axle body in a substance-to-substance bond.

29. The axle attachment of claim 1, wherein the guide-side attachment region is configured for a substance-to-substance bond between the guide-side attachment region and the axle body.

* * * * *